United States Patent [19]

Lohse

[11] Patent Number: 5,993,756
[45] Date of Patent: Nov. 30, 1999

[54] SODIUM TUNGSTATE PREPARATION PROCESS

[75] Inventor: Michael Lohse, Goslar, Germany

[73] Assignee: H.C. Starck, GmbH & Co. KG, Goslar, Germany

[21] Appl. No.: 08/973,224

[22] PCT Filed: Jun. 3, 1996

[86] PCT No.: PCT/EP96/02399

§ 371 Date: May 4, 1998

§ 102(e) Date: May 4, 1998

[87] PCT Pub. No.: WO96/41768

PCT Pub. Date: Dec. 27, 1996

[30] Foreign Application Priority Data

Jun. 12, 1995 [DE] Germany ............ 195 21 333

[51] Int. Cl.$^6$ ............ C01B 19/30; C01C 19/30; C01D 19/30
[52] U.S. Cl. ............ 423/1; 423/61; 423/593; 423/DIG. 12
[58] Field of Search ............ 423/61, 593, DIG. 12

[56] References Cited

U.S. PATENT DOCUMENTS

| | | |
|---|---|---|
| 667,705 | 2/1901 | Holloway et al. .......... 423/61 |
| 1,800,758 | 4/1931 | Schwarzkope . |
| 3,595,484 | 7/1971 | Barnard et al. .......... 241/3 |
| 3,887,680 | 6/1975 | MacInnis et al. .......... 423/55 |
| 4,298,581 | 11/1981 | Douglas et al. .......... 423/58 |
| 4,406,866 | 9/1983 | Reilly .......... 423/61 |
| 4,603,043 | 7/1986 | Douglas et al. .......... 423/593 |

FOREIGN PATENT DOCUMENTS

| | | |
|---|---|---|
| 380 495 | 5/1986 | Austria . |
| 2 051 650 | 9/1971 | France . |
| 3144295 | 2/1983 | Germany . |
| 207 932 | 3/1984 | Germany . |
| 19521333 | 12/1996 | Germany . |
| 157146 | 1/1986 | India . |
| 954472 | 8/1982 | U.S.S.R. .......... 423/61 |
| 791925 | 3/1958 | United Kingdom .......... 423/61 |

*Primary Examiner*—Steven Bos
*Attorney, Agent, or Firm*—Perkins, Smith & Cohen; Jerry Cohen

[57] ABSTRACT

A method for the preparation of sodium tungstate by the oxidation of hard metal scrap and/or heavy metal scrap in a molten salt mixture of hydroxide and sodium sulfate.

8 Claims, 1 Drawing Sheet

SODIUM TUNGSTATE PREPARATION PROCESS

FIELD AND BACKGROUND OF THE INVENTION

The present invention relates to a method for the preparation of sodium tungstate by the oxidation of hard metal scrap and/or heavy metal scrap in a molten salt.

Methods for the recovery of useful materials from ("working up of") hard metal scrap (WC—Co or WC—Co—TaC—TiC) and heavy metal scrap (W—Cu—Ni—Fe) are described in numerous patent publications. Known methods include the oxidation of hard metal scrap at elevated temperatures (U.S. Pat. No. 3,887,680), treatment with liquid zinc (U.S. Pat. No. 3,595,484) or the anodic dissolution of contained binder materials (AT-A 380 495). These methods are either expensive as regards apparatus or are suitable only for certain types of scrap.

Moreover the reaction of hard metal scrap in molten salts is important industrially.

Thus U.S. Pat. No. 4,603,043 describes the working up of W-containing materials in a molten salt consisting of $NaNO_3$ and NaOH at temperatures of 500 to 700° C. Here, in order better to control the reaction, NaOH and the W-containing component are first of all heated to 560 to 600° C. The NaNO3 required as oxidising agent is subsequently added over a period of 2 to 3 hours.

According to DE 3144295, the working up of hard metal scrap is likewise carried out in an alkali hydroxide/alkali nitrate melt, in a molten salt consisting of 40 to 80% alkali nitrate and 20 to 60% alkali hydroxide. 5% of NaCl is added in order to lower the melting point. The melting temperature is 550° C. The melt is subsequently poured into water.

DD-A 207 932 discloses the working up of hard metal scrap in pure sodium nitrate melts or pure sodium nitrite melts. Here the stoichiometric excess of the alkali component is to be 10 to 15% and the melting temperature 900° C. The reacted melt is cooled to room temperature prior to being dissolved in water.

According to IN-A 157 146, a molten salt consisting of alkali hydroxide, preferably KOH or NaOH, and an alkali nitrate as oxidising agent, preferably $KNO_3$ or $NaNO_3$, is employed for the working up of hard metal scrap. The melting temperature varies between 350 and 460° C. In this connection it was established that at 400 to 420° C. the yields of tungsten are 90 to 94%. At 440 to 460° C. the yield of tungsten can be increased to 99%. In this case the reaction can be controlled only with difficulty. In addition emission of nitrogen oxides occurs.

The disadvantage of all reactions in nitrate and/or nitrite media is that the highly exothermic reaction is difficult to control. Consequently the overall reaction is considered to be problematic as regards industrial safety. In addition there is a frequently uncontrollable emission of nitrous gases. Nitrite and nitrate contained in the sodium tungstate solution and in the filtration residues render working up extremely difficult when a solvent extraction has to be subsequently carried out.

The object of the present invention, therefore, is to provide a method for the working up of lumps of hard metal scrap and heavy metal scrap, which does not have the disadvantages described.

SUMMARY OF THE INVENTION

This object was fulfilled according to the invention by the working up by oxidation of tungsten-containing scrap of various compositions in a molten salt consisting of NaOH and $Na_2SO_4$.

The present invention accordingly provides a method for the preparation of sodium tungstate by the oxidation of hard metal scrap and/or heavy metal scrap in a molten salt mixture consisting of from 60 to 90 wt. % of NaOH and from 10 to 40 wt. % of $Na_2SO_4$.

The reaction is preferably carried out in a moving melt, particularly preferably in a batchwise operated directly fired rotary kiln. As protection against stresses the rotary kiln should be lined with a refractory material. The oxidation is advantageously carried out by blowing air into the melt. It is technically efficient to carry out the reaction at temperatures of between 800 and 1100° C. Particularly good digestion data are obtained when the reaction is carried out using a 5 to 20 wt. % excess of alkali components.

The method according to the invention is further explained below, with no limitation to the invention being thereby intended.

BRIEF DESCRIPTION OF THE DRAWING

The sole FIGURE of drawing is a plot of digestion yield (in %) as a function of sodium sulfate content (in %) for air stirred, stirred and unstirred melts.

DETAILED DESCRIPTION OF PREFERRED EMBODIMENTS

Figure 1:
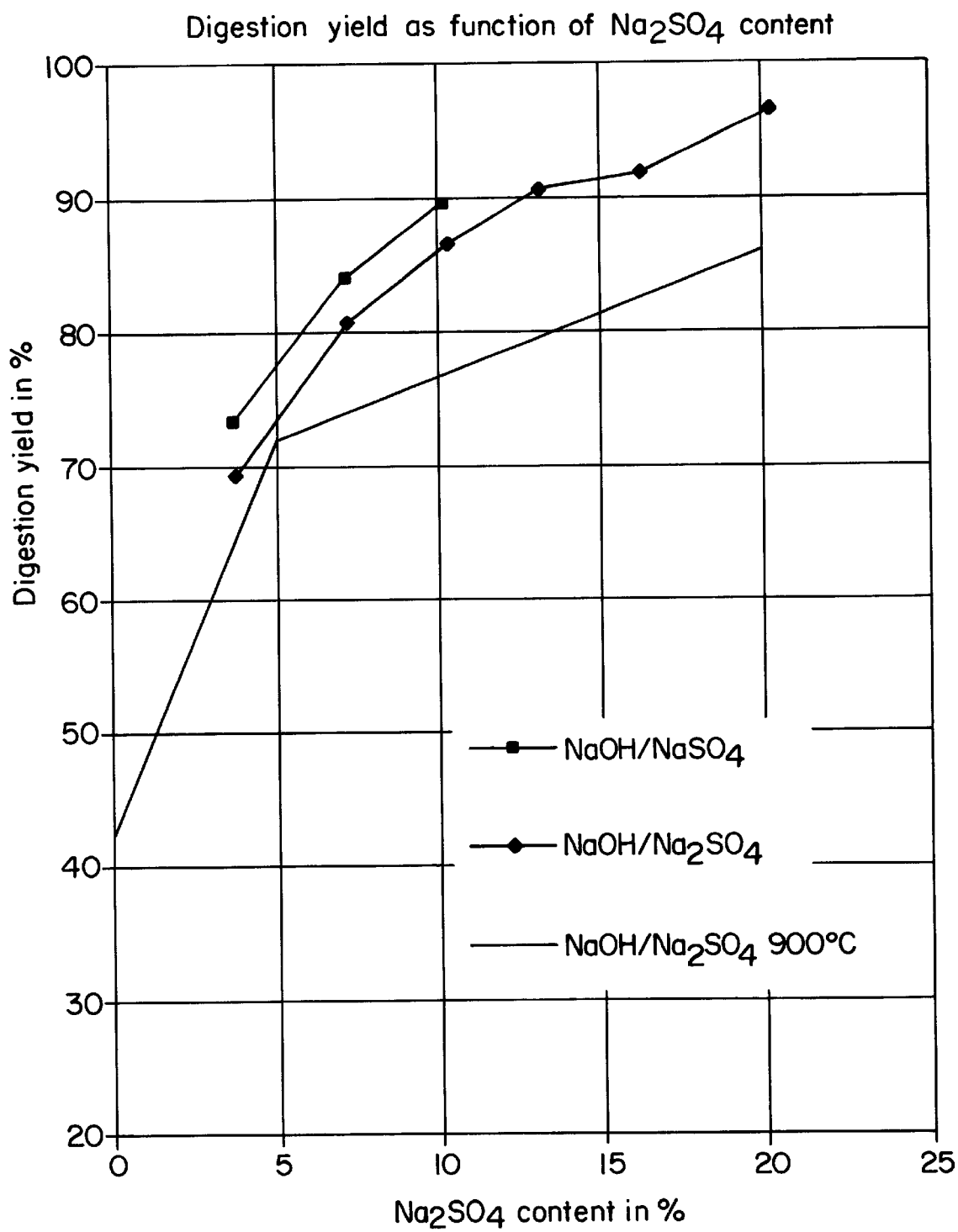

After the liquefaction of the melt, the energy supply is stopped and the reaction is conducted for 4 to 8 hours, with blowing in of air and rotation of the kiln. In the course of this the tungsten content passes from the W-containing materials directly into the sodium tungstate.

An additional energy supply is unnecessary; the reaction can be controlled solely by the volume of air blown in. After termination of the reaction, the $Na_2WO_4$ melt is transferred directly into water through special hoppers. Sodium tungstate dissolves instantly and can be worked up into tungsten carbide powder by the conventional methods.

The rest of the components present in the feed material such as Co, TiC, TaC or Fe, Ni, Cu remain in the residue and can likewise be worked up by known methods.

An advantage of the method according to the invention is that the reaction is mildly exothermic in an $NaOH/Na_2SO_4$ melt. The overall reaction can be efficiently controlled by the blowing in of air, that is, there are no problems as regards industrial safety.

Another advantage is that the alkali compounds used have no adverse effects at all on the further processing of the useful components.

Furthermore, no uncontrollable emission of reaction gases occurs in the course of this reaction.

The method according to the invention is explained below by means of examples, without any limitation being intended.

EXAMPLE 1

1000 kg of lumps of hard metal scrap having the composition 84% WC, 9% Co, 4% TaC, 3% TiC together with 400 kg of NaOH and 150 kg of $Na_2SO_4$ were charged into a batchwise operated rotary kiln lined with a refractory material and heated to about 900° C. Following termination of the reaction after 6 hours, the melt was transferred into about 5 $m^3$ of water and leached. After filtration, the Co, Ti and Ta constituents remained in the residue, whereas the tungsten passed into the filtrate as sodium tungstate and was converted to ammonium paratungstate.

The yield of W from digestion was 86.3%.

EXAMPLE 2

The procedure was as described in Example 1.

In addition, during the six-hour reaction in solution 60 m³ air/hour was blown through the melt. The working up was carried out as described in Example 1.

The yield from digestion was 89.5%.

EXAMPLE 3

1000 kg of lumps of hard metal scrap together with 400 kg of NaOH and 250 kg of $Na_2SO_4$ were melted and worked up as described in Example 1.

The yield of W from digestion was 91.5%.

EXAMPLE 4

1000 kg of lumps of hard metal scrap together with 400 kg of NaOH and 150 kg of $Na_2SO_4$ were digested and processed as in Example 1, but without moving the melt.

The yield of W from digestion was 75.1%.

The melt variables chosen in the Example and the yields from digestion as a function of the $Na_2SO_4$ content are shown in FIG. 1.

I claim:

1. Method for the preparation of sodium tungstate by the oxidation of tungston-containing hard metal scrap and/or heavy metal scrap in a molten salt, comprising (a) placing solid pieces of the scrap in a molten salt mixture consisting of from 60 to 90 wt. % of NaOH and from 10 to 40 wt. % of $Na_2SO_4$ and (b) oxidizing the molten salt mixture containing the scrap to form sodium tungstate.

2. Method according to claim 1, wherein the oxidation is carried out in a moving melt.

3. Method according to either one of claims 1 or 2, wherein the oxidation is carried out in a batchwise operated directly fired rotary kiln.

4. Method according to one of claims 1 or 2, characterised in that air is blown into the molten salt mixture.

5. Method according to one of claims 1 or 2, wherein the oxidation is carried out at temperatures of between 800 and 1100° C.

6. Method according to one of claims 1 or 2, wherein the oxidation is carried out with a 5 to 20 wt. % excess of sodium containing components.

7. Method according to either of claims 1 or 2 wherein the oxidation is carried out between 800 and 1,000° C. and with a 5 to 20 weight percent excess of sodium containing components.

8. Method according to claim 7 wherein air is blown into the molten salt mixture.

* * * * *